(12) United States Patent
Mese et al.

(10) Patent No.: US 11,080,075 B2
(45) Date of Patent: Aug. 3, 2021

(54) DATA THRESHOLD NOTIFICATION

(71) Applicant: Lenovo (Singapore) Pte. Ltd., Singapore (SG)

(72) Inventors: John Carl Mese, Cary, NC (US); Russell Speight VanBlon, Raleigh, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 175 days.

(21) Appl. No.: 15/892,869

(22) Filed: Feb. 9, 2018

(65) Prior Publication Data

US 2019/0250936 A1    Aug. 15, 2019

(51) Int. Cl.
  *G06F 9/46* (2006.01)
  *G06F 9/455* (2018.01)
(52) U.S. Cl.
  CPC .............. *G06F 9/45512* (2013.01)
(58) Field of Classification Search
  None
  See application file for complete search history.

(56) References Cited

U.S. PATENT DOCUMENTS

| | | | | |
|---|---|---|---|---|
| 9,137,739 | B2* | 9/2015 | Raleigh | H04L 63/0853 |
| 10,248,728 | B1* | 4/2019 | Ledet | G06Q 30/0633 |
| 2012/0155296 | A1* | 6/2012 | Kashanian | H04L 12/1417 370/252 |
| 2013/0149994 | A1* | 6/2013 | Gaddam | H04L 41/069 455/406 |
| 2014/0018033 | A1* | 1/2014 | Luna | H04W 28/0215 455/405 |
| 2014/0068212 | A1* | 3/2014 | Lin | H04M 15/58 711/162 |
| 2017/0052792 | A1* | 2/2017 | Cox | G06F 9/445 |

* cited by examiner

*Primary Examiner* — Kenneth Tang
(74) *Attorney, Agent, or Firm* — Ference & Associates LLC

(57) ABSTRACT

One embodiment provides a method, including: receiving, at an information handling device, a user command to perform a function; determining, using a processor, whether execution of the function exceeds a data threshold; and providing, responsive to determining that execution of the function exceeds the data threshold, a notification to a user. Other aspects are described and claimed.

14 Claims, 3 Drawing Sheets

DATA THRESHOLD NOTIFICATION

BACKGROUND

Information handling devices ("devices"), for example laptop and personal computers, smart phones, tablet devices, and the like, may provide users the means to access the Internet through subscription to a network connection plan with an Internet Service Provider ("ISP"). A common type of network connection plan is a metered network connection. In such a plan, a user is allotted a predetermined amount of data usage per day or month.

BRIEF SUMMARY

In summary, one aspect provides a method, comprising: receiving, at an information handling device, a user command to perform a function; determining, using a processor, whether execution of the function exceeds a data threshold; and provide, responsive to determining that execution of the function exceeds the data threshold, a notification to a user.

Another aspect provides an information handling device, comprising: a processor; a memory device that stores instructions executable by the processor to: receive a user command to perform a function; determine whether execution of the function exceeds a data threshold; and provide, responsive to determining that execution of the function exceeds the data threshold, a notification to a user.

A further aspect provides a product, comprising: a storage device that stores code, the code being executable by a processor and comprising: code that receives a user command to perform a function; code that determines whether execution of the function exceeds a data threshold; and code that provides, responsive to determining that execution of the function exceeds the data threshold, a notification to a user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
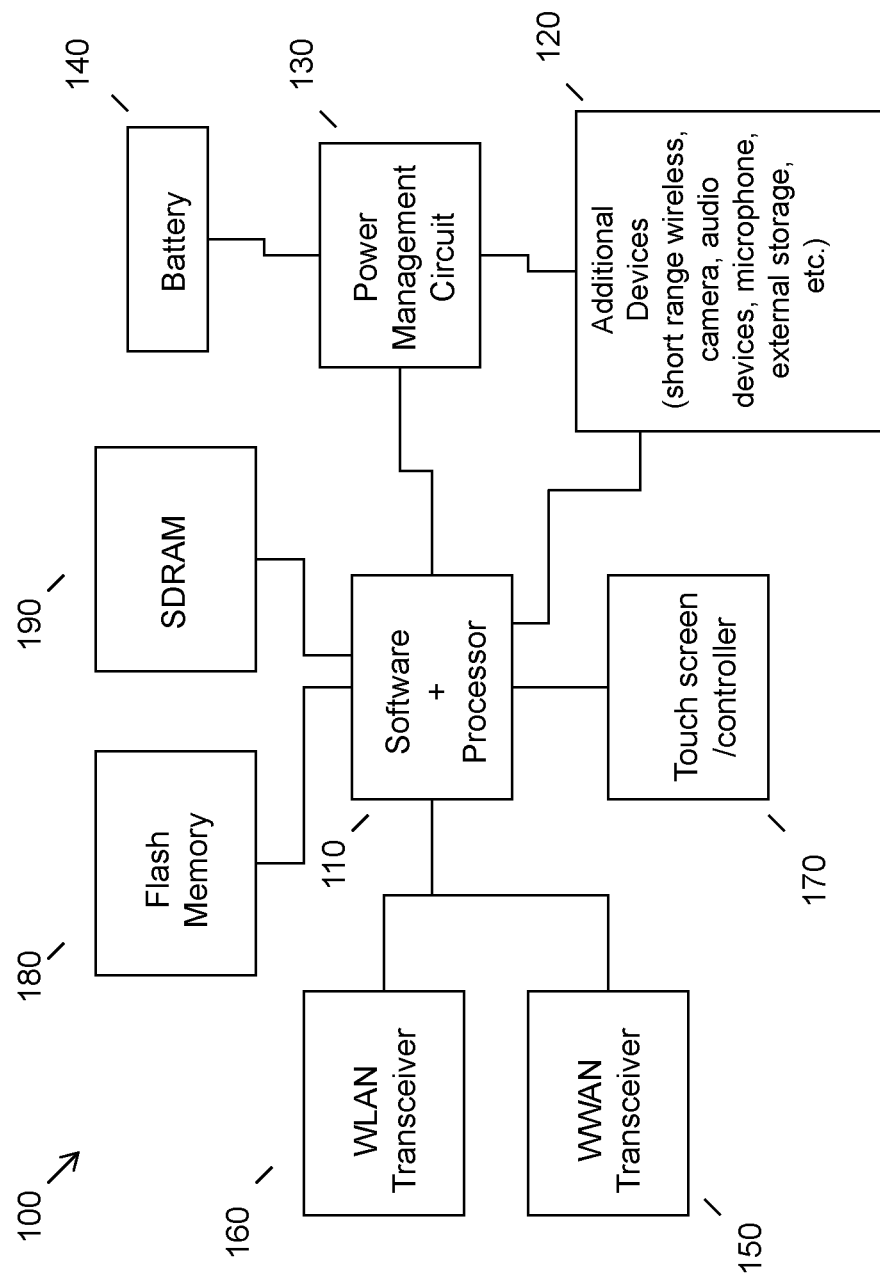
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When using a metered connection, if a user exceeds their allotted data limit, they may be billed for additional charges, have their connection speed reduced until the current billing cycle ends, a combination thereof, and the like. Despite being cognizant about their data usage, many users may unwittingly use more data than they intend. For example, users often look at a plurality of webpages during an Internet browsing session. Many webpages have embedded videos, or other background applications, that immediately activate when the webpage is opened. The activation of these programs consumes data, even if a user does not care to consume the content these applications provide or is even aware of their existence. As another example, when a user provides a selection input to open a file, the file may be much larger than they expected, consequently consuming a greater amount of data than they intended to consume. The unwitting consumption of data while browsing may cause a user to exhaust their data allotment quicker and/or exceed their allotted data limit.

The aforementioned issue may be exacerbated when multiple devices are using the same metered connection. For example, a household may have a single metered connection but may contain multiple devices (e.g., a smart phone, a tablet, a laptop, etc.) capable of accessing the Internet through that connection plan. In such a situation, the allotted data limit of the metered connection may be exhausted more quickly because multiple devices may be used to access and browse, potentially simultaneously, content on the Internet. The scope of this problem will likely increase as WWAN/4G network devices become more common in PCs, especially since improving the cross-functionality between PCs and mobile devices has become a greater investment interest for major software and computer development companies.

Currently, solutions exist to address the issue of excessive data consumption on some mobile devices. For example, Android® operating systems can limit applications from using background data. In another example, e-mail clients can opt to defer the automatic download of attachments and/or limit message size. In yet a further example, some webpages may provide an optimized version of their site for mobile devices, the use of which would consume less than data than if a user accessed a standard, or non-optimized, version of the webpage. However, no mechanism currently exists to safeguard against greater than intended data consumption across all device types. More particularly, the aforementioned solutions are only applicable for mobile devices and do not apply to PCs.

Accordingly, an embodiment may provide a notification to a user responsive to determining that execution of a user commanded function may exceed a data threshold. In an embodiment, a user command to perform a function may be received at an information handling device (e.g., smart phone, tablet, laptop or personal computer, etc.). An embodiment may then determine whether execution of the function will exceed a particular data threshold. Responsive to determining that execution of the function will exceed the data threshold, an embodiment may provide a notification to a user. Such a method may alert a user that a function they have just commanded the system to perform may exceed a particular data threshold (e.g., a data limit threshold of an identified metered connection setting, a maximum data amount any function can consume in executing the function, etc.).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
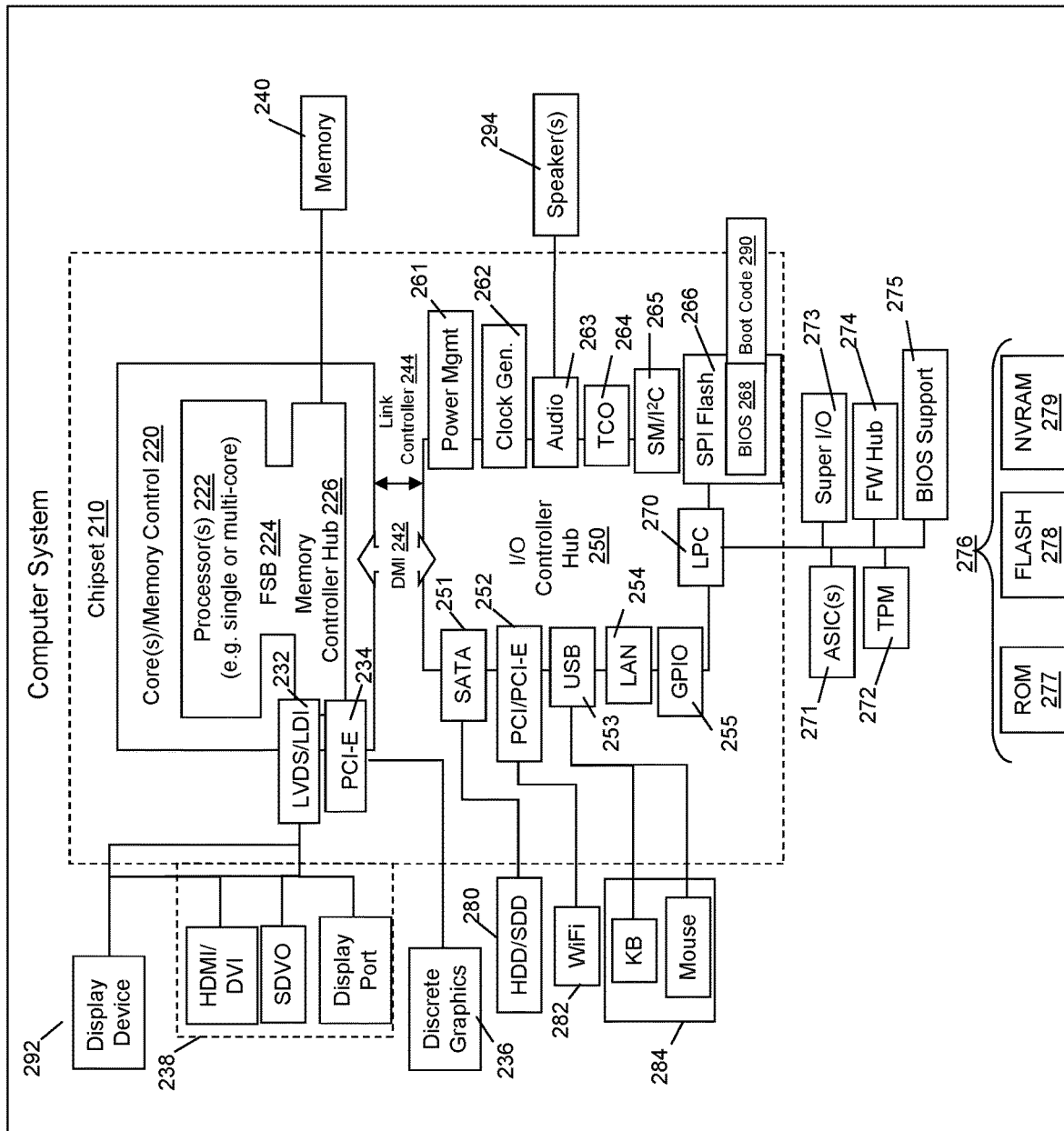
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal and laptop computer devices generally, and/or electronic devices which may have Internet browsing capabilities. For example, the circuitry outlined in FIG. 1 may be implemented in a tablet or smart phone embodiment, whereas the circuitry outlined in FIG. 2 may be implemented in a personal computer embodiment.

Figure 3:
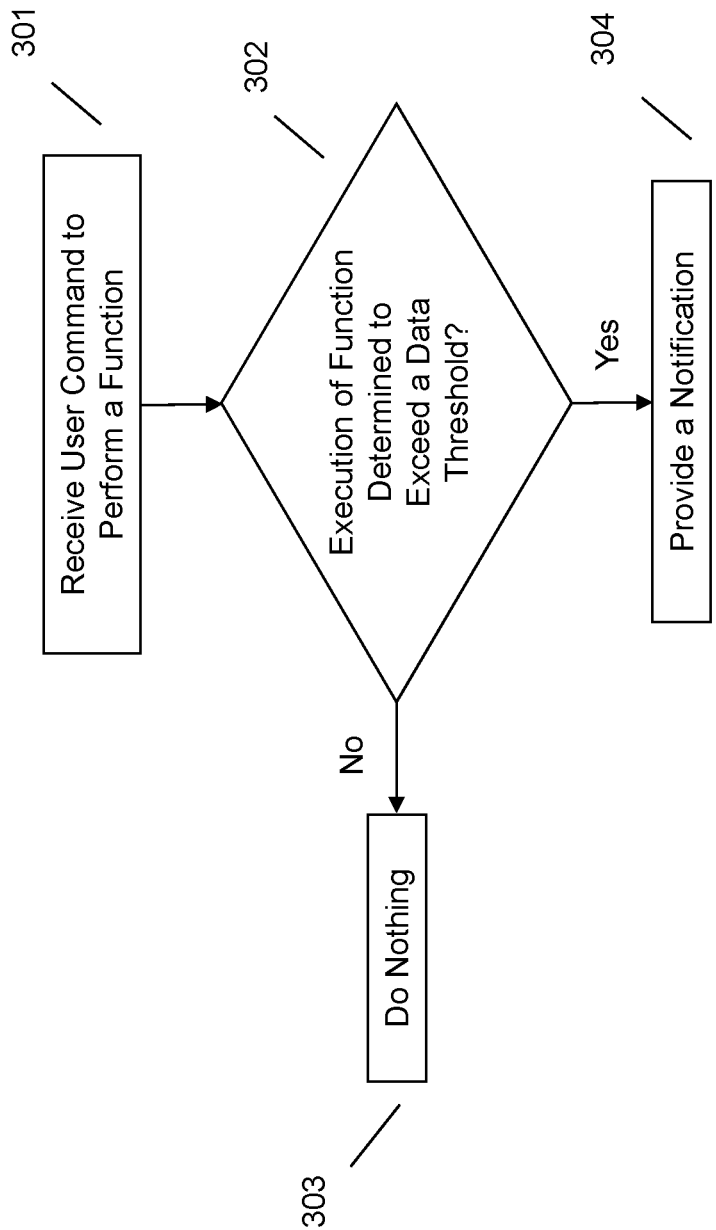
FIG. 3 illustrates an example method of providing a notification to a user responsive to determining that execution of a user commanded function may exceed a data threshold.

Referring now to FIG. 3, an embodiment may provide a notification to a user responsive to determining that execution of a user commanded function may exceed, or come close to, a data limit of a metered connection setting. At 301, an embodiment may receive a user command to perform a function at a device (e.g., smart phone, tablet, laptop and/or personal computer, etc.). In the context of this application the user command may be a command provided using virtually any input form. For example, the user command may be a text-based command, a verbal command, a gesture command, a combination thereof, and the like. In an embodiment, the command may be received at an input device (e.g., physical keyboard, on-screen keyboard, audio capture device, image capture device, video capture device, etc.) and may be thereafter be recognized and processed by at least one processor of the device.

In an embodiment, the user command may request the system of the device to perform a particular function. For example, a user may provide command input requesting the system to download one or more files. As another example, the command input may request the system to open a link or navigate to a different webpage. In yet another example, the command input may request the system to stream a video or a music file. Although a plurality of functions corresponding to user commands have just been listed, it should be understood that these functions are not limiting and persons having ordinary skill in the art will recognize that other functions, not explicitly listed here, may also be performed.

At 302, an embodiment may determine whether execution of the function will exceed a data threshold. In an embodiment, the data threshold may correspond to a data limit threshold of an identified metered connection setting. For example, the data threshold may be a daily, or monthly, amount of data allotted to the user (e.g., 5 gigabytes, 10 gigabytes, 20 gigabytes, etc.) as part of their metered network connection plan. In another embodiment, an embodiment may determine whether execution of the function results in a remaining data amount, with respect to the allotted data limit threshold, being less than a predetermined amount. For example, an embodiment may determine that if a download function is performed, the remaining data left from an allotted data amount will fall below a predetermined amount. In yet another embodiment, the data threshold may correspond to a maximum amount of data the processing of any function can consume. For example, a user may adjust their network settings to prevent the performance of any function that is projected to utilize more data than the user-adjusted threshold amount. In an embodiment, the data threshold may be a configurable threshold that may be originally set by a manufacturer and later adjusted by a user.

In an embodiment, one or more determination methods may be utilized to determine whether execution of the function exceeds the data threshold. For example, in an embodiment the determination may involve identifying a historical data consumption amount associated with the execution of the function. The historical data consumption amount may correspond to an average amount of data that is generally consumed when a function is performed. The determination of this average amount may be identified by examination of past performances of the function by the user or other users. For example, an embodiment may identify that the average amount of data historically consumed when File X is downloaded is about 150 megabytes. In a similar example, an embodiment may identify that the average amount of data historically consumed when a user opens Link Y is about 10 megabytes. In an embodiment, the historical data consumption associated with execution of the function may be represented, for example, by a table. In an embodiment, the table may be dynamically updated (e.g., each time a user performs a function listed in the table, etc.) and may be stored in an accessible storage database (e.g., cloud storage, remote storage, local storage, network storage, etc.).

In an embodiment, the determination may involve identifying metadata associated with execution of the function. For example, certain links may have metadata attached to them that may describe how much data execution of the link consumes. An embodiment may examine the information included in the metadata to determine if execution of the function will exceed some threshold.

Responsive to determining, at 302, that execution of the function will not exceed a data threshold, an embodiment may, at 303, take no additional action. Conversely, responsive to determining, at 302, that execution of the function will exceed a data threshold, an embodiment may provide, at 304, a notification to a user apprising them of that fact.

In an embodiment, the notification may be an audible notification (e.g., a sound, an audible message, etc.), a visual notification (e.g., a pop-up message, an icon, etc.), a haptic notification (e.g., a vibration, etc.) a combination thereof, and the like. In an embodiment, the audible notification may be provided through a speaker, another output device, and the like. In an embodiment, the visual notification may be provided through a display screen, another display device, and the like. In an embodiment, the output device may be integral to the user's device or may be located on another device in communication with the user's device. For example, a user may be browsing the Internet on their laptop while wearing a smart watch. Responsive to determining that execution of a function on the laptop will exceed some data threshold, the smart watch may be apprised of this determination and provide a notification to a user (e.g., display an alert on a display screen of the smart watch, etc.).

In an embodiment, the notification may be provided prior to execution of the function. For example, once the determination is made that performance of the function will exceed some data threshold, an embodiment may provide the notification to the user prior to executing the function. In an embodiment, the function may not be performed unless additional user input is received responsive to the notification. For example, as part of the notification, an embodiment may display a message to a user alerting them that performance of the function will exceed a data threshold. The message may also query the user if they want to proceed with execution of the function. If the user provides confirmation input (e.g., presses a "proceed" button, etc.) an embodiment may perform the function. If the user provides cancellation input (e.g., presses a "cancel" button, etc.) an embodiment may not perform the function.

In an embodiment, the notification may comprise an estimation of how much additional data, above a data limit threshold of an identified metered connection setting, may be consumed by execution of the function. For example, an embodiment may determine that performance of the function will exceed the data limit threshold by 300 megabytes. This information may then be displayed to the user as part of the notification along with a query asking the user if they would like to proceed with performance of the function.

In an embodiment, a user may adjust their notification settings so that notifications are provided for some functions but not others. For example, a user may prioritize performance of a system update over the downloading of a music file or navigation to a different webpage. Responsive to determining that the downloading of the music file or navigation to the different webpage exceeds some data threshold, an embodiment may provide a notification as described in the aforementioned embodiments. Conversely, responsive to determining that processing of the system update will exceed some threshold, an embodiment may nonetheless process the update without providing a notification to the user.

The various embodiments described herein thus represent a technical improvement to conventional data overconsumption notification techniques. Using the techniques described herein, an embodiment may receive a user command to perform a function. An embodiment may then determine whether execution of the function will exceed some data threshold. The data threshold may be one of a variety of different types of data thresholds (e.g., a data limit threshold corresponding to a metered network setting, a function-specific data threshold, etc.). Responsive to determining that the execution of the function will exceed the data threshold, an embodiment may provide an alert notification to a user. Such techniques may provide a preemptive alert notification to users that a function they have requested to be performed will exceed some data threshold or results in the total data left to be lower than another predetermined threshold.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an information handling device, a user command to perform a function;
    determining, using a processor, that execution of the function results in a remaining data amount for a data cycle that is less than a predetermined amount with respect to a data limit threshold for the data cycle, wherein the determining comprises:
        identifying a consumed data amount in the data cycle;
        identifying a projected data amount to be consumed by execution of the function, wherein the identifying the projected data amount comprises utilizing historical data associated with execution of the function; and
        determining whether a difference between the data limit threshold and a sum of the consumed data amount with the projected data amount is less than the predetermined amount; and
    providing a notification to a user prior to execution of the function.

2. The method of claim 1, wherein the function is selected from the group consisting of a download function, a navigation function, and a stream function.

3. The method of claim 1, wherein the determining comprises identifying a historical data consumption amount associated with execution of the function.

4. The method of claim 1, wherein the determining comprises identifying metadata associated with execution of the function.

5. The method of claim 1, wherein the data threshold corresponds to a maximum data amount any function can consume in executing the function.

6. The method of claim 1, wherein the notification comprises an estimation of how much additional data, above the data limit threshold, may be consumed by execution of the function.

7. The method of claim 1, wherein the providing comprises providing, responsive to determining that execution of the function results in the remaining data amount being less than the predetermined amount, the notification.

8. An information handling device, comprising:
a processor;
a memory device that stores instructions executable by the processor to:
receive a user command to perform a function;
determine that execution of the function results in a remaining data amount for a data cycle that is less than a predetermined amount with respect to a data limit threshold for the data cycle, wherein the instructions executable by the processor to determine comprise instructions executable by the processor to:
identify a consumed data amount in the data cycle;
identify a projected data amount to be consumed by execution of the function, wherein the identifying the projected data amount comprises utilizing historical data associated with execution of the function; and
determine whether a difference between the data limit threshold and a sum of the consumed data amount with the projected data amount is less than the predetermined amount; and
provide a notification to a user prior to execution of the function.

9. The information handling device of claim 8, wherein the function is selected from the group consisting of a download function, a navigation function, and a stream function.

10. The information handling device of claim 8, wherein the instructions executable by the processor to determine comprise instructions executable by the processor to identify a historical data consumption amount associated with execution of the function.

11. The information handling device of claim 8, wherein the data threshold corresponds to a maximum data amount any function can consume in executing the function.

12. The information handling device of claim 8, wherein the notification comprises an estimation of how much additional data, above the data limit threshold, may be consumed by execution of the function.

13. The information handling device of claim 8, wherein the instructions executable by the processor to provide comprise instructions executable by the processor to provide, responsive to determining that execution of the function results in the remaining data amount being less than the predetermined threshold, the notification.

14. A product, comprising:
a storage device that stores code, the code being executable by a processor and comprising:
code that receives a user command to perform a function;
code that determines that execution of the function results in a remaining data amount for a cycle that is less than a predetermined amount with respect to a data limit threshold for the data cycle, wherein the code that determines comprises:
code that identifies a consumed data amount in the data cycle;
code that identifies projected data amount to be consumed by execution of the function, wherein the identifying the projected data amount comprises utilized historical data associated with execution of the function; and
code that determines whether a difference between the data limit threshold and a sum of the consumed data amount with the projected data amount is less than the predetermined amount; and
code that provides a notification to a user prior to execution of the function.

* * * * *